United States Patent Office 3,542,847
Patented Nov. 24, 1970

3,542,847
PROCESS FOR ISOMERIZING 3-PENTENENITRILE TO 4-PENTENENITRILE
William C. Drinkard, Jr., Wilmington, and Richard V. Lindsey, Jr., Hockessin, Del., assignors to E. I. du Pont de Nemours and Company, Wilmington, Del., a corporation of Delaware
No Drawing. Continuation-in-part of application Ser. No. 679,608, Nov. 1, 1967. This application Sept. 15, 1969, Ser. No. 858,098
Int. Cl. C07c 121/30
U.S. Cl. 260—465.9                                                    7 Claims

ABSTRACT OF THE DISCLOSURE

Process of isomerizing 3-pentenenitriles to 4-pentenenitrile using platinum or palladium catalysts having a valence of +2 or less and of adding hydrogen cyanide to nonconjugated carbon-carbon double bonds such as in 4-pentenenitrile at from −25 to 200° C. using catalysts of the structure Pd(PX$_3$)$_4$ where X is R or OR and R is an alkyl or aryl group of up to 18 carbon atoms.

CROSS-REFERENCE TO RELATED APPLICATION

This application is a continuation-in-part of application Ser. No. 679,608, filed on Nov. 1, 1967, by William Charles Drinkard, Jr., and Richard V. Lindsey, Jr., now abandoned.

DESCRIPTION OF THE PRIOR ART

It is known that the addition of hydrogen cyanide to double bonds adjacent an activating group such as a nitrile or acyloxy group, proceeds with relative ease. However, the addition of hydrogen cyanide to nonactivated double bonds proceeds only with difficulty, if at all, and normally requires the use of high pressures of about 1,000 p.s.i. or more and high temperatures in the range of 200 to 400° C. U.S. Pat. No. 2,571,099, issued Oct. 16, 1951 to Paul Arthur, Jr., and Burt Carlson Pratt, discloses a technique which involves the use of nickel carbonyl with or without the addition of a tertiary aryl phosphine or arsine. This process suffers from producing a relatively high percentage of undesirable polymeric products when applied to monoolefinic starting materials and a relatively poor yield in all cases. Furthermore, this process is not satisfactory for the production of adiponitrile from 3- or 4-pentenenitrile. The selective formation of 4-pentenenitrile from 3-pentenenitrile rather than the thermodynamically more stable 2-pentenenitrile is believed to be unknown in the art.

SUMMARY OF THE INVENTION

The present invention provides a process which produces nitriles or dinitriles from olefins in high yield, under mild conditions, with minimal formation of polymer.

The hydrocyanation process of the present invention is generally applicable to nonconjugated unsaturated compounds of from 2 to 20 carbon atoms having at least one ethylenic carbon-carbon double bond, which organic compounds are selected from the class consisting of aliphatic and aromatic hydrocarbons and aliphatic and aromatic hydrocarbons containing groups selected from the class consisting of —OH, —CN,

and

wherein each open bond is connected to hydrogen or an aliphatic or aromatic hydrocarbon group, wherein the carbon-carbon double bond is insulated from the aforesaid group by at least 1 carbon atom. The 3-pentenenitrile, 4-pentenenitrile and 2-methyl-3-butenenitrile are preferred. Suitable unsaturated compounds include monoolefins and monoolefins substituted with groups which do not attack the catalyst such as cyano. These unsaturated compounds include monoolefins containing from 2 to 20 carbon atoms such as ethylene, propylene, butene-1, pentene-2, hexene-2, etc., and substituted compounds such as styrene, α-methyl styrene, 3-pentenenitrile, and 4-pentenenitrile. The process also finds special advantage in the production of 2-methylglutaronitrile from 2-methyl-3-butenenitrile.

In the preferred process of the present invention wherein adiponitrile is formed from 3-pentenenitrile the reaction proceeds in two steps. The first step involves the isomerization of 3-pentenenitrile to 4-pentenenitrile followed by the addition of hydrogen cyanide to 4-pentenenitrile to form adiponitrile.

The first step is catalyzed by palladium or platinum compounds having a valence of +2 or less such as palladium dihalides, and the hereinbelow defined platinum compounds and palladium compounds. In carrying out the isomerization step using (0) valent palladium or platinum an acid preferably also is present. Suitable acids include hydrogen cyanide, trifluoroacetic acid, hydrochloric acid, sulfuric acid, etc., as well as the hereinbelow defined compounds for use as promoters for the hydrocyanation reaction wherein a palladium catalyst is used.

The preferred isomerization process of converting 3-pentenenitrile to 4-pentenenitrile is carried out in the presence of a compound of the general formula M(PX$_3$)$_4$, wherein M is Pd or Pt, wherein X is OR or R wherein R is selected from the class consisting of alkyl and aryl groups having up to 18 carbon atoms. The hydrocyanation step is carried out in the presence of a compound of the formula Pd(PX$_3$)$_4$ wherein X is defined as above. If desired, any of the X's may be cojoined.

The catalyst preferably is prepared prior to use. However, the catalyst can be prepared in situ by any of several methods such as by adding a divalent palladium or platinum compound such as a palladium or platinum halide, palladium or platinum acetylacetonate, palladium or platinum acetate; a compound of the formula PX$_3$ where X has the meaning defined above and a reducing agent such as Al(CH$_2$CH$_3$)$_3$, zinc metal, iron, aluminum, magnesium, hydrazine, or sodium borohydride. While the amount of catalyst present is not critical, it is generally preferable that excess unsaturated compound be present.

The hydrocyanation or isomerization reaction can be carried out with or without a solvent. The solvent should be a liquid at the reaction temperature and inert towards the unsaturated compound and the catalyst. Generally, such solvents are hydrocarbons such as benzene, xylene, or nitriles such as acetonitrile, benzonitrile, or adiponitrile.

The exact temperature used is dependent, to a certain extent, on the particular catalyst being used, the particular unsaturated compound being used and the desired rate. Generally, temperatures of from —25° C. to 200° C. can be used with from 0° C. to 150° C. being the preferred range for both isomerization and hydrocyanation.

Either reaction may be carried out by charging a reactor with all of the reactants. In the case of hydrocyanation, preferably the reactor is charged with the catalyst or catalyst components, the unsaturated compound and whatever solvent is to be used. The hydrogen cyanide gas is then swept over the surface of the reaction mixture or bubbled into said reaction mixture. Alternately, the hydrogen cyanide can be introduced in liquid form. If desired, when using a gaseous unsaturated organic compound, the hydrogen cyanide and the unsaturated organic compound may be fed together into the reaction medium. The molar ratio of unsaturated compound to catalyst generally is varied from about 10:1 to 2000:1 unsaturated compound to catalyst for a batch operation. In a continuous operation such as when using a fixed bed catalyst type of operation, a much higher proportion of catalyst may be used such as 1:2 unsaturated compound to catalyst.

Optionally, a promoter may be used to activate the catalyst for the hydrocyanation reaction. The promoter generally is a boron compound or a cationic form of a metal selected from the class consisting of zinc, cadmium, beryllium, aluminum, gallium, indium, thallium, titanium, zirconium, hafnium, erbium, germanium, tin, vanadium, niobium, scandium, chromium, molybdenum, tungsten, manganese, rhenium, thorium, iron and cobalt. Among these the cations of zinc, cadmium, titanium, tin, chromium, iron and cobalt are preferred. Suitable promoters of this type are salts of the metals listed above and include aluminum chloride, zinc chloride, cadmium iodide, titanium trichloride, titanium tetrachloride, zinc acetate, ethyl aluminum dichloride, chromic chloride, stannous chloride, zinc iodide, nickel chloride, cerous chloride, cobaltous iodide, cadmium chloride, molybdenum dichloride, zirconium chloride, thorium chloride, aluminum chloride, ferrous chloride and cobaltous chloride.

The boron compounds are borohydrides or organoboron compounds, of which organoboron compounds are of the structure $B(R')_3$, are preferred.

The borohydrides are the alkali metal borohydrides, such as sodium borohydride and potassium borohydride, and the quaternary ammonium borohydrides particularly the tetra (lower alkyl)ammonium borohydrides and borohydrides of the formula $B_nH_{n+4}$ where $n$ is an integer of from 2 to 10, and $B_mH_{m+6}$ where $m$ is an integer of from 4 to 10. When the boron compounds have the structure $B(R')_3$, R' is selected from the class consisting of H, aryl radicals of from 6 to 18 carbon atoms, lower alkyl radicals of from 1 to 7 carbon atoms, and lower alkyl radicals of from 1 to 7 carbon atoms substituted with a cyano radical. Generally, the case where R' is phenyl, as in triphenyl borane, or phenyl substituted with an electronegative radical is preferred.

The nitriles formed by the present invention are useful as chemical intermediates. For instance, adiponitrile is an intermediate used in the production of hexamethylene diamine which is used in the production of polyhexamethylene adipamide, a commercial polyamide, useful in forming fibers, films and molded articles. Other nitriles can be converted to the corresponding acids and amines which are conventional commercial products.

DESCRIPTION OF THE PREFERRED EMBODIMENTS

Example I

A 50 ml., three-necked round bottom glass flask, fitted with a water cooled reflux condenser connected to a Dry Ice trap, a gas inlet above the liquid level and a magnetic stirrer is set up in an oil bath maintained at 100° C. The flask is purged with nitrogen gas and charged with 0.64 g. of $PdCl_2$, 3.7 g. of $Al(C_2H_5)_3$, 0.68 g. of $SnCl_2$, 15 ml. of $P(OC_6H_5)_3$, and 20 g. of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 21 hours the reaction is shut down.

Gas chromatographic analysis indicates that the crude reaction mixture contains 13.0 percent adiponitrile, 5.4 percent 2-methylglutaronitrile, and 1.4 percent ethylsuccinonitrile.

Example II

A 50 ml., three-necked round bottom glass flask, fitted with a water cooled reflux condenser connected to a Dry Ice trap, a gas inlet above the liquid level and a magnetic stirrer is set up in an oil bath maintained at 70° C. The flask is purged with nitrogen gas and charged with 0.64 g. of $PdCl_2$, 3.7 g. of $Al(C_2H_5)_3$, 0.68 g. of $SnCl_2$, 15 ml. of $P(OC_6H_5)_3$ and 20 g. of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 18 hours the reaction is shut down.

Gas chromatographic analysis indicates that the crude reaction mixture contains 3.9 percent adiponitrile, 2.3 percent 2-methylglutaronitrile, and 1.1 percent ethyl succinonitrile.

Example III

A 50 ml., three-necked round bottom glass flask, fitted with a water cooled reflux condenser connected to a Dry Ice trap, a gas inlet above the liquid level and a magnetic stirrer is set up in an oil bath maintained at 70° C. The flask is purged with nitrogen gas and charged with 1.35 g. of $Pd[P(OC_6H_5)_3]_4$, and 20 g. of 3-pentenenitrile. A stream of nitrogen gas is bubbled through liquid hydrogen cyanide contained in a 20-ml. flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 20 hours and 30 minutes the reaction is shunt down.

Gas chromatographic analysis indicates that the crude reaction mixture contains 0.39 percent adiponitrile and 0.07 percent 2-methylglutaronitrile.

Example IV

A 50 ml., three-necked round bottom glass flask, fitted with a water cooled reflux condenser connected to a Dry Ice trap, a gas inlet above liquid level and a magnetic stirrer is set up in an oil bath maintained at 100° C. The flask is purged with nitrogen gas and charged with 1.35 g. of $Pd[P(OC_6H_5)_3]_4$, 0.14 g. of $ZnCl_2$, 3.1 g. of $P(OC_6H_5)_3$, and 20 g. of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 28 hours the reaction is shut down.

Gas chromatographic analysis indicates that the crude reaction mixture contains 8.8 percent adiponitrile, 4.9 percent 2-methylglutaronitrile, and 1.0 percent ethylsuccinonitrile.

Example V

A 50 ml., three-necked round bottom glass flask, fitted with a water cooled reflux condenser connected to a Dry Ice trap, a gas inlet above the liquid level and a magnetic stirrer is set up in an oil bath maintained at 100° C. The flask is purged with nitrogen gas and charged with 1.35 g. of $Pd[P(OC_6H_5)_3]_4$, 0.19 g. of $SnCl_2$, 3.1 g. of $P(OC_6H_5)_3$, and 20 g. of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 4.5 hours the reaction is shut down.

Gas chromatographic analysis indicates that the crude reaction mixture contains 3.54 percent adiponitrile, 1.49 percent 2-methylglutaronitrile, and 0.37 percent ethylsuccinonitrile.

Example VI

A 50 ml., three-necked round bottom glass flask, fitted with a water cooled reflux condenser connected to a Dry Ice trap, a gas inlet above the liquid level and a magnetic stirrer is set up in an oil bath maintained at 100° C. The flask is purged with nitrogen gas and charged with 1.35 g. of $Pd[P(OC_6H_5)_3]_4$, 0.15 g. of $TiCl_3$, and 20 g. of 3-pentenenitrile. A stream of nitrogen gas is bubbled through liquid hydrogen cyanide contained in a flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 21 hours the reaction is shut down.

Gas chromatographic analysis indicates that the crude reaction mixture contains 6.82 percent adiponitrile, 2.60 percent 2-methylglutaronitrile, and 0.64 percent ethylsuccinonitrile.

Example VII

A 50 ml., three-necked round bottom glass flask, fitted with a water cooled reflux condenser connected to a Dry Ice trap, a gas inlet above the liquid level and a magnetic stirrer is set up in an oil bath maintained at 100° C. The flask is purged with nitrogen gas and charged with 1.35 g. of $Pd[P(OC_6H_5)_3]_4$, 0.24 g. of $B(C_6H_5)_3$, 3.1 g. of $P(OC_6H_5)_3$, and 20 g. of 3-pentenenitrile. A stream of nitrogen gas is bubbled through liquid hydrogen cyanide contained in a flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 29 hours the reaction is shut down.

Gas chromatographic analysis indicates that the crude reaction mixture contains 19.34 percent adiponitrile, 3.37 percent 2-methylglutaronitrile, and 0.46 percent ethylsuccinonitrile.

Example VIII

A 50 ml., three-necked round bottom glass flask, fitted with a water cooled reflux condenser connected to a Dry Ice trap, a gas inlet above the liquid level and a magnetic stirrer is set up in an oil bath maintained at 100° C. The flask is purged with nitrogen gas and charged with 1.35 g. of $Pd[P(OC_6H_5)_3]_4$, 0.24 g. of $B(C_6H_5)_3$, and 20 g. of 3-pentenenitrile. A stream of nitrogen gas is bubbled through liquid hydrogen cyanide contained in a flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 29 hours the reaction is shut down.

Gas chromatographic analysis indicates that the crude reaction mixture contains 25.05 percent adiponitrile, 5.19 percent 2-methylglutaronitrile, and 0.76 percent ethylsuccinonitrile.

Example IX

A 50 ml., three-necked round bottom glass flask, fitted with a water cooled reflux condenser connected to a Dry Ice trap, a gas inlet above the liquid level and a magnetic stirrer is set up in an oil bath maintained at 100° C. The flask is purged with nitrogen gas and charged with 1.35 g. of $Pd[P(OC_6H_5)_3]_4$, 0.34 g. of $CrCl_3$ (tetrahydrofuran)$_3$, and 20 g. of 3-pentenenitrile. A stream of nitrogen gas is bubbled through liquid hydrogen cyanide contained in a flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 24 hours the reaction is shut down.

Gas chromatographic analysis indicates that the crude reaction mixture contains 9.64 percent adiponitrile, 3.51 percent 2-methylglutaronitrile, and 0.81 percent ethylsuccinonitrile.

Example X

A 50 ml., three-necked round bottom glass flask, fitted with a water cooled reflux condenser connected to a Dry Ice trap, a gas inlet above the liquid level and a magnetic stirrer is set up in an oil bath maintained at 60° C. The flask is purged with nitrogen gas and charged with 1.35 g. of $Pd[P(OC_6H_5)_3]_4$, 0.24 g. of $B(C_6H_5)_3$, and 20 g. of 3-pentenenitrile. A stream of nitrogen gas is bubbled through liquid hydrogen cyanide contained in a flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 19 hours the reaction is shut down.

Gas chromatographic analysis indicates that the crude reaction mixture contains 20.14 percent adiponitrile, 3.37 percent 2-methylglutaronitrile, and 0.37 percent ethylsuccinonitrile.

Example XI

A 50 ml. three-necked round bottom glass flask, fitted with a water cooled reflux condenser connected to a Dry Ice trap, a gas inlet above the liquid level and a magnetic stirrer is set up in an oil bath maintained at 100° C. The flask is purged with nitrogen gas and charged with 1.35 g. of $Pd[P(OC_6H_5)_3]_4$, 0.13 g. of $MnCl_2$, and 20 g. of 3-pentenenitrile. A stream of nitrogen gas is bubbled through liquid hydrogen cyanide contained in a flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 20 hours the reaction is shut down.

Gas chromatographic analysis indicates that the crude reaction mixture contains 4.84 percent adiponitrile, 2.34 percent 2-methylglutaronitrile, and 1.95 percent ethylsuccinonitrile.

Example XII

A 50 ml., three-necked round bottom glass flask fitted with a water cooled reflux condenser connected to a Dry Ice trap, a gas inlet above the liquid level and a magnetic stirrer is set up in an oil bath maintained at 100° C. The flask is purged with nitrogen gas and charged with 1.35 g. of $Pd[P(OC_6H_5)_3]_4$, 0.13 g. of $CoCl_2$, and 20 g. of 3-pentenenitrile. A stream of nitrogen gas is bubbled through liquid hydrogen cyanide contained in a flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 20 hours the reaction is shut down.

Gas chromatographic analysis indicates that the crude reaction mixture contains 19.65 percent adiponitrile, 11.29 percent 2-methylglutaronitrile, and 1.95 percent ethylsuccinonitrile.

Example XIII

A 50 ml., three-necked round bottom glass flask fitted with a water cooled reflux condenser connected to a Dry Ice trap, a gas inlet above the liquid level and a magnetic stirrer is set up in an oil bath maintained at 100° C. The flask is purged with nitrogen gas and charged with 1.35 g. of $Pd[P(OC_6H_5)_3]_4$, 0.42 g. of $ZnCl_2$, and 20 g. of 3-pentenenitrile. A stream of nitrogen gas is bubbled through liquid hydrogen cyanide contained in a flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 29 hours the reaction is shut down.

Gas chromatographic analysis indicates that the crude reaction mixture contains 18.1 percent adiponitrile, 9.9 percent 2-methylglutaronitrile, and 1.5 percent ethylsuccinonitrile.

Example XIV

A 50 ml., three-necked, round bottom glass flask fitted with a water cooled reflux condenser connected to a Dry Ice trap, an inlet tube above the liquid level, and a magnetic stirrer is set up in an oil bath. The flask is purged with nitrogen gas and charged with 1.8 g. of $PdCl_2$ and 20 g. of 3-pentenenitrile, and further purged with nitrogen gas after which the oil bath is heated to 80° C. for 20 hours at which time the reaction is shut down.

Gas chromatographic analysis indicates that the crude reaction mixture contains 7.43 percent 4-pentenenitrile.

Example XV

A 50 ml., three-necked round bottom glass flask fitted with a water cooled reflux condenser connected to a Dry Ice trap, a gas inlet tube above the liquid level, and a magnetic stirrer is set up in an oil bath. The flask is purged with nitrogen gas and charged with 1.8 g. of $PdCl_2$, 20 g. of 3-pentenenitrile and 1 ml. of glacial acetic acid, and further purged with nitrogen gas, after which the oil bath is heated to 80° C. for 20 hours at which time the reaction is shut down.

Gas chromatographic analysis indicates that the crude reaction mixture contains 7.2 percent 4-pentenenitrile.

Example XVI

A 50 ml., three-necked round bottom glass flask fitted with a water cooled reflux condenser connected to a Dry Ice trap, an inlet tube above the liquid level, and a magnetic stirrer is set up in an oil bath. The flask is purged with nitrogen gas, charged with 2.6 g. of $PtCl_2$ and 20 g. of 3-pentenenitrile, and further purged with nitrogen gas after which the oil bath is heated to 80° C. for 20 hours at which time the reaction is shut down.

Gas chromatographic analysis indicates that the crude reaction mixture contains 0.7 percent 4-pentenenitrile.

Example XVII

A 50 ml., three-necked round bottom glass flask fitted with a water cooled reflux condenser connected to a Dry Ice trap, a gas inlet above liquid level and a magnetic netic stirrer is set up in an oil bath. The flask is purged with nitrogen gas, charged with 0.62 g. of $Pt[P(C_6H_5)_3]_4$, 0.1 ml. of pure trifluoroacetic acid, and 20 g. of 3-pentenenitrile; and further purged with nitrogen gas after which the oil bath is heated to 100° C. for 24 hours at which time the reaction is shut down.

Gas chromatographic analysis indicates that the crude reaction mixture contains 1.0 percent 4-pentenenitrile.

Example XVIII

A 50 ml., three-necked round bottom glass flask, fitted with a water cooled reflux condenser connected to a Dry Ice trap, a gas inlet above liquid level and a magnetic stirrer is set up in an oil bath maintained at 80° C. The flask is purged with nitrogen gas and charged with 1.35 g. of $Pd[P(OC_6H_5)_3]_4$, 0.24 g. of $B(C_6H_5)_3$, and 20 g. of dicyclopentadiene. A stream of nitrogen gas is bubbled through liquid hydrogen cyanide contained in a 20 ml. flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 19 hours the reaction is shut down.

Gas chromatographic analysis indicates that the crude reaction mixture contains about 1 percent of hydrocyanated dicyclopentadiene. Product was identified by infrared and nuclear magnetic resonance spectra.

Example XIX

A 50 ml., three-necked round bottom glass flask, fitted with a water cooled reflux condenser connected to a Dry Ice trap, a gas inlet above liquid level and a magnetic stirrer is set up in an oil bath maintained at 80° C. The flask is purged with nitrogen gas and charged with 1.35 g. of $Pd[P(OC_6H_5)_3]_4$, 0.24 g. of $B(C_6H_5)_3$, and 20 g. of styrene. A stream of nitrogen gas is bubbled through liquid hydrogen cyanide contained in a 20 ml. flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 19 hours the reaction is shut down.

Gas chromatographic analysis indicates that the crude reaction mixture contains about one percent of hydrocyanated strene. Product was identified by infrared and nuclear magnetic resonance spectra.

Example XX

A 50 ml. three-necked, round bottom glass flask, fitted with a water cooled reflux condenser connected to a Dry Ice trap, an inlet tube above the liquid level and a magnetic stirrer is set up in an oil bath. The flask is purged with nitrogen gas and charged with 0.26 g. of $Pd[P(OC_6H_5)_3]_4$, 0.07 g. of $ZnCl_2$, and 20 g. of 3-pentenenitrile and 1 ml. of triphenylphosphite, and further purged with nitrogen gas after which the oil bath is heated to 80° C. for 24 hours at which time the reaction is shut down.

Gas chromatographic analysis indicates that the crude reaction mixture contains 2.5 percent 4-pentenenitrile.

Example XXI

A 50 ml., three-necked, round bottom glass flask, fitted with a water cooled reflux condenser connected to a Dry Ice trap, a gas inlet above the liquid and a magnetic stirrer is set up in an oil bath maintained at 100° C. The flask is purged with nitrogen gas and charged with 1.35 g. of $Pd[P(OC_6H_5)_3]_4$, 0.24 g. of $B(C_6H_5)_3$, and 20 g. of 3-pentenenitrile free of 4-pentenenitrile. A stream of nitrogen gas is bubbled through liquid hydrogen cyanide contained in a 20 ml. flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 20 hours the reaction is shut down.

Twenty-five minutes after startup a 2 ml. sample of the crude reaction mixture is removed from the reaction flask and found by gas chromatographic analysis to contain 4.94 percent 4-pentenenitrile.

After shut down the gas chromatographic analysis indicates that the crude reaction mixture contains 4.64 percent adiponitrile, 0.82 percent 2-methylglutaronitrile, and 0.17 percent ethylsuccinonitrile and 5.59 percent 4-pentenenitrile.

Example XXII

A 50 ml., three-necked round bottom glass flask, fitted with a water cooled reflux condenser connected to a Dry Ice trap, a gas inlet above the liquid level and a magnetic stirrer is set up in an oil bath maintained at 100° C. The flask is purged with nitrogen gas and charged with 1.35 g. of Pd[P(OC$_6$H$_5$)$_3$]$_4$, 20 g. of 2-methyl-3-butenenitrile, and 0.24 g. of B(C$_6$H$_5$)$_3$. A stream of nitrogen gas is bubbled through liquid hydrogen cyanide contained in a 20 ml. flask cooled in an ice bath. The resulting gas mixture is swept across the surface of the reaction mixture in the flask. The nitrogen gas flow is adjusted so that 0.2 ml. per hour of hydrogen cyanide (measured as a liquid at 0° C.) is fed to the reaction flask. After 44 hours the reaction is shut down.

Gas chromatographic analysis indicates that the crude reaction mixture contains 1.44 percent adiponitrile, 55.63 percent 2-methylglutaronitrile, and 0.04 percent ethylsuccinonitrile.

Example XXIII

The reaction flask, as described in Example XXII, is charged with 1.35 g. of Pd[P(OC$_6$N$_5$)$_3$]$_4$, 0.2 g. of ZnCl$_2$, 20 ml. of

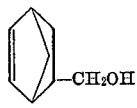

and 6.0 g. of P(OC$_6$H$_5$)$_3$. The mixture is maintained at 100° C. for 22.5 hours, while HCN is swept across the reaction at a rate of 0.2 ml./hour, measured as a liquid at 0° C. Infrared analysis shows a strong nitrile absorption band at 2240 cm.$^{-1}$ which shows the presence of products resulting from the addition of HCN to the double bond of

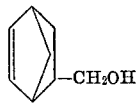

Example XXIV

The reaction flask, as described in Example XXII, is charged with 1.35 g. of Pd[P(OC$_6$H$_5$)$_3$]$_4$, 0.2 g. of ZnCl$_2$, 20 ml. of

CN, and 6.0 g. of P(OC$_6$H$_5$)$_3$. The mixture is maintained at 100° C. for 23.5 hours while HCN is swept across the reaction at a rate of 0.1 ml./hour (measured as a liquid at 0° C.).

Gas chromatographic analysis shows that the crude product contains peaks corresponding to a known sample of hydrocyanated

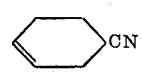CN

Example XXV

The reaction flask, as described in Example XXII, is charged with 1.35 g. of Pd[P(OC$_6$H$_5$)$_3$]$_4$, 0.2 g. of ZnCl$_2$, 20 ml. of

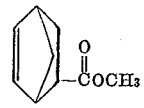

and 6.0 g. of P(OC$_6$H$_5$)$_3$. The mixture is maintained at 100° C. for 22 hours while HCN is swept across the reaction at a rate of 0.08 ml./hour (measured as a liquid at 0° C.).

Gas chromatographic analysis shows that the crude product contains peaks corresponding to a known sample of hydrocyanated

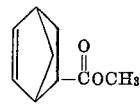

Example XXVI

The reaction flask, as described in Example XXII, is charged with 1.35 g. of Pd[(OC$_6$H$_5$)$_3$]$_4$, 0.2 g. of ZnCl$_2$, 20 ml. of

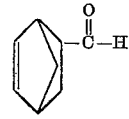

and 6.0 g. of P(OC$_6$H$_5$)$_3$. The mixture is maintained at 100° C. for 22.5 hours, while HCN is swept across the reaction at a rate of 0.5 ml./hour, (measured as a liquid at 0° C.).

Gas chromatographic analysis shows that the crude product contains peaks corresponding to a known sample of hydrocyanated

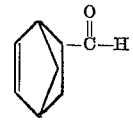

Example XXVII

The reaction flask, as described in Example XXII, is charged with 1.35 g. of Pd[P(OC$_6$N$_5$)$_3$]$_4$, 0.24 g. of B(C$_6$H$_5$)$_3$ and 20 g. of 3-pentenenitrile. The mixture is maintained at 100° C. while a mixture of N$_2$ and HCN gas is swept across the surface at a rate of 0.07 ml./hour (measured as a liquid at 0° C.) for 20 hours.

Gas chromatographic analysis shows that the crude product contains 4.64% adiponitrile.

Gas chromatographic analyses also shows that the crude product contains 5.59% 4-pentenenitrile. The starting 3-pentenenitrile reagent contains no 4-pentenenitrile.

Example XXVIII

The reaction flask, as described in Example XXII, is charged with 1.35 g. of Pd[P(OC$_6$H$_5$)$_3$]$_4$ and 20 g. of 3-pentenenitrile. The mixture is stirred for 3 hours at 100° C.

Gas chromatographic analysis shows that the crude product contains 4.65% 4-pentenenitrile.

In Examples XXIX to LII, the reaction flask, as described in Example XXII, is flushed with nitrogen, then charged with 20 g. of 3-pentenenitrile along with the catalyst system listed in the table below. The reaction mixture maintained at the temperature indicated in swept with HCN nitrogen mixture at the flow rate and for the length of time shown. The reaction products are analyzed by gas chromatographic analysis. The legend for the products is as follows: A=adiponitrile; B=2-methylglutaronitrile; C=ethylsuccinonitrile.

Examples XXIX to XXXIX illustrate further the use of promoters for the catalyst system in the hydrocyanation reaction. The preparation of the catalyst system in situ is illustrated in Examples XL to XLV. The use of a mixed alkyl-aryl phosphite ligand is illustrated in Example XLVI. Use of a phosphite ligand having 15 carbon atoms in each R group is shown in Example XLVII and use of phosphine ligands is illustrated in Examples XLVIII to LII.

of palladium and platinum, X is selected from the group consisting of R and OR and R is selected from the class consisting of alkyl and aryl groups having up to 18 carbon atoms, and forming 4-pentenenitrile.

5. The process of claim 4 wherein there is present, in addition to the compound of structure $M(PX_3)_4$, an acid of the group consisting of hydrogen cyanide, trifluoroacetic acid, hydrochloric acid and sulfuric acid.

6. The process of claim 4 wherein there is present,

TABLE 1

| Catalyst, g. | Reaction temperature, °C. | Flow, ml./hr. | Time, hrs. | Products, percent |
|---|---|---|---|---|
| Example: | | | | |
| XXIX    Pd[P(OC$_6$H$_5$)$_3$]$_4$, 1.35; NiCl$_2$, 0.13; P(OC$_6$H$_5$)$_3$, 3.1 | 100 | 0.6 | 19 | A, 0.25; B, 0.089 C, 0.08 |
| XXX     Pd[P(OC$_6$H$_5$)$_3$]$_4$, 1.35; CeCl$_3$, 0.25; P(OC$_6$H$_5$)$_3$, 3.1 | 100 | 0.5 | 22 | A, 0.73; B, 0.31; C, 0.11 |
| XXXI    Pd[P(OC$_6$H$_5$)$_3$]$_4$, 1.35; CoI$_2$, 0.31; P(OC$_6$H$_5$)$_3$, 3.1 | 100 | | | A, 1.62; B, 0.65; C, 0.11 |
| XXXII   Pd[P(OC$_6$H$_5$)$_3$]$_4$, 1.35; CdCl$_2$, 0.18; P(OC$_6$H$_5$)$_3$, 3.1 | | | | A, 2.96; B, 1.32; C, 0.23 |
| XXXIII  Pd[P(OC$_6$H$_5$)$_3$]$_4$, 1.35; MoCl$_2$, 0.17; P(OC$_6$H$_5$)$_3$, 3.1 | 100 | 0.2 | 21 | A, 11.55; B, 3.74; C, 0.66 |
| XXXIV   Pd[P(OC$_6$H$_5$)$_3$]$_4$, 1.35; ZrCl$_4$, 0.23; P(OC$_6$H$_5$)$_3$, 3.1 | 100 | 0.3 | 21 | A, 6.78; B, 2.15; C, 0.39 |
| XXXV    Pd[P(OC$_6$H$_5$)$_3$]$_4$, 1.35; ThCl$_4$, 0.37; P(OC$_6$H$_5$)$_3$, 3.1 | 100 | 0.2 | 20 | A, 1.41; B, 0.38; C, 0.1 |
| XXXVI   Pd[P(OC$_6$H$_5$)$_3$]$_4$, 1.35; ZrCl$_4$, 0.23; P(OC$_6$H$_5$)$_3$, 3.1 | 100 | 0.2 | 21 | A, 4.26; B, 0.69; C, 0.092 |
| XXXVII  Pd[P(OC$_6$H$_5$)$_3$]$_4$, 1.35; AlCl$_3$, 0.13; P(OC$_6$H$_5$)$_3$, 3.1 | 100 | 0.2 | 21 | A, 4.12; B, 1.62; C, 0.21 |
| XXXIX   Pd[P(OC$_6$H$_5$)$_3$]$_4$, 1.35; CoCl$_2$, 0.13; P(OC$_6$H$_5$)$_3$, 3.1 | 100 | 0.3 | 17 | A, 12.26; B, 6.76; C, 1.34 |
| XL      PdCl$_2$, 0.18; Fe, 0.06; P(OC$_6$H$_5$), 6.2 | 100 | 0.3 | 17 | A, 4.21; B, 2.64; C, 0.6 |
| XLI     PdCl$_2$, 0.18; Zn, 0.07; P(OC$_6$H$_5$)$_3$, 6.2 | 100 | 0.3 | 19 | A, 10.51; B, 5.17; C, 0.93 |
| XLII    PdCl$_2$, 0.18; NaBH$_4$, 0.5; P(OC$_6$H$_5$)$_3$, 6.2 | 100 | 0.1 | 6 | A, 1.75; B, 0.29 |
| XLIII   PdCl$_2$, 0.18; Zn, 0.07; P(OC$_6$H$_5$), 7.0 | 100 | 0.6 | 21 | A, 1.82; B, 0.87; C, 0.32 |
| XLIV    PdCl$_2$, 0.18; Al, 0.1; B(C$_6$H$_5$)$_3$, 0.3; P(OC$_6$H$_5$)$_3$, 6.2 | 100 | 0.2 | 21 | A, 0.857; B, 0.42; C, 0.12 |
| XLV     PdCl$_2$, 0.18; Mg, 0.1; B(C$_6$H$_5$)$_3$, 0.3; P(OC$_6$H$_5$)$_3$, 6.0 | 100 | 0.2 | 21 | A, 0.926; B, 0.192 |
| XLVI    PdCl$_2$, 0.18; Zn, 0.1; P(OC$_6$H$_5$)$_2$(OC$_8$H$_{15}$), 5.5 | 100 | 0.2 | 21 | A, 2.42; B, 1.26; C, 0.41 |
| XLVII   PdCl$_2$, 0.64; Al(C$_2$H$_5$)$_3$ 5 ml.; P(OC$_6$H$_4$—C$_9$H$_{19}$)$_3$, 28 | 100 | 0.7 | 21 | A, 20.8; B, 14.12; C, 3.25 |
| XLVIII  PdCl$_2$, 0.8; Zn, 0.6; ZnCl$_2$, 0.6; P(C$_6$H$_5$)$_3$, 5.2 | 80 | 0.04 | 22 | A, 8.06; B, 3.16; C, 1.61 |
| XLIX    PdCl$_2$, 0.8; Zn, 0.6; P(C$_6$H$_5$)$_3$, 2.6 | 80 | 0.1 | 21 | A, 14.73; B, 5.66; C, 2.84 |
| L       PdCl$_2$, 0.8; Zn, 0.6; P(C$_6$H$_5$)$_3$, 3.9 | 80 | 0.3 | 21 | A, 9.936; B, 3.947; C, 2.243 |
| LI      PdCl$_2$, 0.8; Zn, 0.6; ZnCl$_2$, 0.6; P(C$_4$H$_9$)$_3$, 5.0 | 80 | 0.2 | 21 | A, 0.44; B, 0.26 |
| LII     PdCl$_2$, 0.8; Fe, 0.6; P(C$_6$H$_5$)$_3$, 5.2 | 80 | 0.07 | 21 | A$_2$, 1.345; B, 0.368 |

The foregoing examples also illustrate the use of an excess of ligand such as an aryl phosphite or an aryl phosphine with the catalyst complex. The molar ratio of the excess ligand to catalyst is at least 2:1 and preferably at least 8:1.

For recovery of the hydrocyanation products, conventional techniques may be employed such as crystallization of the product from solution or distillation.

What is claimed is:

1. A process of isomerizing 3-pentenenitrile to 4-pentenenitrile which comprises contacting 3-pentenenitrile with a chloride of a metal of the group consisting of palladium and platinum, the metal having a valence no greater than +2 at a temperature of from −25° C. to 200° C. and forming 4-pentenenitrile.

2. The process of claim 1 wherein the chloride of a metal is palladium chloride.

3. The process of claim 1 wherein the chloride of a metal is platinum chloride.

4. A process of isomerizing 3-pentenenitrile to 4-pentenenitrile which comprises contacting in a reactor 3-pentenenitrile and a compound of the structure $M(PX_3)_4$ wherein M is a metal selected from the group consisting in addition to the compound of structure $M(PX_3)_4$, a cation of a metal selected from the group consisting of zinc, cadmium, titanium, tin, chromium, iron and cobalt.

7. The process of claim 4 wherein there is present, in addition to the compound of structure $M(PX_3)_4$, a boron compound selected from the class consisting of alkali metal and tetra (lower alkyl) ammonium borohydrides, borohydrides of the structure $B_nH_{n+4}$ wherein $n$ is an integer of from 2 to 10 and $B_mH_{m+6}$ where $m$ is an integer of from 4 to 10 and organo boron compounds of the formula $B(R')_3$ wherein $R'$ is selected from the class consisting of aryl radicals of from 6 to 18 carbon atoms, lower alkyl radicals and cyano substituted lower alkyl radicals.

References Cited

UNITED STATES PATENTS 3,347,900  10/1967  Gossel et al. _____ 260—465.3
3,407,223  10/1968  Kominami et al. ____ 260—465.3

JOSEPH P. BRUST, Primary Examiner

U.S. Cl. X.R.

260—465, 465.1, 465.3, 465.4, 465.6, 465.8